United States Patent Office 3,567,607
Patented Mar. 2, 1971

3,567,607
IRRADIATED METAL-POLYMER COMPOSITIONS
Frank L. Saunders, James K. Rieke, and James W. Twining, Midland, Mich., assignors to The Dow Chemical Company, Midland, Mich.
No Drawing. Filed Feb. 18, 1966, Ser. No. 528,348
Int. Cl. B01j 1/10, 1/12
U.S. Cl. 204—159.2      10 Claims

ABSTRACT OF THE DISCLOSURE

A composition useful for fabricating an article having improved tensile and impact strength, said composition comprising at least 40 percent by volume of an irradiated olefin polymer such as polyethylene and at least 40 percent by volume of finely divided metallic particles such as aluminum. The composition is prepared by dry blending the irradiated polymer and the metallic particles to form a uniform mixture. The mixture is then formed into the article desired by, for example, a suitable molding technique.

---

This invention relates to metal-polymer compositions and, more particularly, it relates to irradiated olefin polymers having interspersed therein fine metallic particles.

It is known in the art to add powdered metal and other inorganic fillers to thermoplastic polymers to improve certain properties of the polymer, particularly the modulus. However, other important properties such as tensile and impact strength are not correspondingly improved. In fact, at higher concentrations of the metal powder, such properties may actually decrease. It would therefore be highly desirable to provide metal powder-polymer compositions that would not only show improved modulus but also greater tensile and impact strength.

In accordance with the present invention, metal-polymer compositions are provided in a composition comprising at least 40 volume percent of an irradiated olefin polymer wherein said polymer has interspersed therein at least 40 volume percent of finely divided metallic particles.

The term "volume" as used herein is defined as the volume calculated from the mass or weight of the metal particles and thermoplastic material employed divided by the respective densities.

In one method of making the preferred embodiment of the present invention, up to about 50 volume percent of a fine metal powder such as aluminum is added to an irradiated polymer of ethylene. The mixture is dry blended to obtain an intimately mixed blend of the aluminum and polymer powder. It is understood that other methods of obtaining suitable metal-polymer blends may also be employed. The composition can be easily cast, extruded, molded or otherwise formed into sheets, tubes or articles having a wide variety of shapes and capable of many different uses and applications, with the metal powder particles being uniformly distributed throughout the resulting article.

Suitable polymers for practicing the present invention include olefin polymers such as polyethylene, polypropylene, poly(4-methyl-1-pentene), and the like and also copolymers such as a copolymer of ethylene and propylene, ethylene and butene-1, and the like.

The polymers are irradiated by preferably reducing them to a powder and exposing them to a radiation dose of from about 0.25 to about 5 megarads and preferably from about 0.5 to about 2 megarads. The polymer may be irradiated by means of any conventional high energy electron source or γ-ray source.

Metal filler components for the copolymer are any finely divided metal particles, mixtures thereof, metal alloys or metal oxides. Examples of suitable fillers include aluminum, lead, iron, mixtures of carbon black and metal powders and the like. Various metal particle sizes may be employed to attain certain desired properties. However, favorable particle sizes should be in the range from about 5 microns to about 300 microns and preferably from about 13 microns to about 20 microns. It is understood that blends of metal filler with other suitable fillers can also be used in practicing this invention.

The concentration of the metal filler is in the range from about 40 percent to about 60 percent and preferably from about 46 percent to about 55 percent by volume based on the volume of metal filler present in the total polymer-metal composition.

The composition of the present invention may be used for making molded cups, magnetic cores for electro-magnets, machined parts, housings, decorative articles, gears, bearings, pulleys, and the like.

The following examples are illustrative of the invention and are not intended to limit the scope thereof.

EXAMPLE 1

A 200-gm. portion of high density polyethylene powder (<200 mesh) was subjected to high energy electrons from a 1 mev. Van der Graff generator to a dose of 1 megarad (operating at 137 μamps, 4 passes at 0.25 megarad/pass).

Twenty-five gm. (about 51 volume percent) of the above irradiated polyethylene powder was dry blended with 75 gm. (about 49 volume percent) of aluminum powder, having an average particle size of 19 microns in diameter, in a cone blendor. The powder blend was compression molded in a hydraulic press into a sheet measuring ⅛" x 8" x 8" at a temperature of 200° C. for 3 minutes at a pressure of 20,000 lbs. platen pressure. The sheet had the following properties:

Tensile strength, p.s.i.: 4370
Tensile modulus, p.s.i.×$10^{-5}$: 8.7
Elongation, percent: 2.4
Impact strength, ft.-lbs./in. notch: 1.23.

EXAMPLES 2–7

The procedure of Example 1 was substantially repeated except that the intensity of the radiation dose was varied for each test. The improvement in some of the physical properties is noted in the table below.

Example 2 is not an example illustrative of the invention but is for comparative purposes only. The test is intended to show the undesirably low values obtained, particularly for tensile and impact strength, when the polymer is not irradiated.

TABLE

| Example: | Irradiation dose, mrads | Tensile strength, p.s.i. | Elongation, percent | Impact strength, ft./lb./in. notch |
|---|---|---|---|---|
| 2 | 0.0 | 2,780 | 0.5 | 0.39 |
| 3 | 0.25 | 40420 | 2.2 | 0.89 |
| 4 | 0.5 | 4,502 | 2.3 | 1.05 |
| 5 | 1.0 | 4,370 | 2.4 | 1.23 |
| 6 | 2.0 | 4,310 | 2.9 | 1.24 |
| 7 | 5.0 | 4,250 | 2.9 | 1.06 |

In place of the particular polymers and metal particles employed in the metal-polymer compositions of the foregoing examples, other polymers and metal particles may be employed, as hereinbefore described, to obtain substantially the same results.

What is claimed is:
1. A shaped article having improved impact strength, said article comprising at least 40 volume percent of a normally solid irradiated olefin polymer, said polymer having interspersed therein at least 40 volume percent of finely divided metallic particles having an average size from about 5 microns to about 300 microns.

2. The article according to claim 1 wherein the polymer is polyethylene.

3. The article according to claim 1 wherein the metallic particles are aluminum.

4. The article according to claim 1 comprising at least 40 volume percent of irradiated polyethylene, said polyethylene having interspersed therein at least 40 volume percent of finely divided aluminum particles having an average size of about 19 microns.

5. The article according to claim 1 wherein the olefin polymer is irradiated by subjecting the same to a radiation dose of from about 0.25 to about 5 megarads.

6. A method for improving the impact strength of a normally solid olefin polymer containing at least 40 volume percent of finely divided metallic particles, having an average size from about 5 microns to about 300 microns, which comprises (1) irradiating the polymer in the form of a powder with a radiation dose of about 0.25 to about 5 megarads, (2) intimately admixing at least 40 volume percent of the irradiated polymer with the finely divided metallic particles without heating and (3) forming the resulting mixture into a shaped article.

7. The method according to claim 6 wherein the polymer is polyethylene.

8. The method according to claim 6 wherein the metallic particles are aluminum.

9. The method according to claim 6 wherein the resulting mixture is molded into a shaped article.

10. The method according to claim 6 wherein the resulting mixture is extruded in the form of a sheet.

References Cited
UNITED STATES PATENTS
3,412,358   11/1968   Hummel et al. _____ 252—511

SAMUEL H. BLECH, Primary Examiner

R. B. TURER, Assistant Examiner

U.S. Cl. X.R.

252—511, 512, 513; 260—41